Sept. 3, 1963  A. L. BRODY ETAL  3,102,779
APPARATUS AND METHOD OF PRESERVING ANIMAL AND PLANT MATERIALS
Filed Jan. 30, 1963
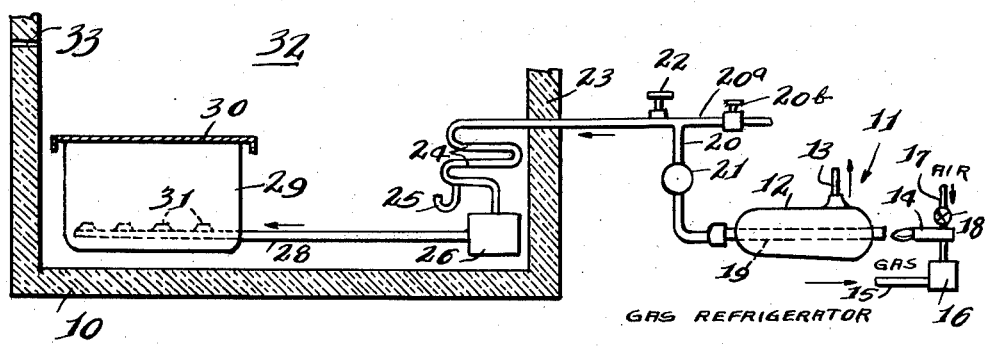
Inventors.
Aaron L. Brody.
Jess W. Thomas.
By: Hofgren, Brady, Wegner,
Allen & Stellman
Attorneys.

United States Patent Office 3,102,779
Patented Sept. 3, 1963

3,102,779
APPARATUS AND METHOD OF PRESERVING ANIMAL AND PLANT MATERIALS
Aaron L. Brody, Morristown, N.J., and Jess W. Thomas, St. Joseph, Mich., assignors to Whirlpool Corporation, a corporation of Delaware
Filed Jan. 30, 1963, Ser. No. 258,098
8 Claims. (Cl. 21—58)

This invention relates to an apparatus and method of storing perishable animal and plant materials including both food materials and non-food materials.

This is a continuation-in-part application of our copending application Serial No. 62,660, filed October 14, 1960, now abandoned.

Stored animal and plant materials immediately begin to deteriorate because of combinations of various changes taking place in these materials. In general, these changes are brought about by the following actions: physiological, such as that brought about by enzymes, naturally occurring in all plant and animal materials; microbiological, caused principally by microorganisms such as bacteria, yeasts and molds which are natural contaminates of all plant and animal materials; biochemical, which is primarily caused by oxidation resulting in such end effects as rancidity and non-enzymatic browning; and physical, exemplified by dehydration and plasmolysis.

Physiological and microbiological degradation or deterioration which are the main causes of spoilage due to such degradation or deterioration in stored animal and plant materials are both dependent on respiratory activities. During this respiratory activity oxygen is assimilated from the surrounding atmosphere and carbon dioxide and water are produced as degradation products. As to whether the major or initial degradation will be a result of physiological or microbiological activity is a function of the nature of the raw material, the level and type of contamination, the maturity of the materials, and the storage temperature. Generally speaking, plant materials degrade physiologically prior to any significant microbiological changes whereas the opposite is true for animal materials.

The physiological degradation of stored plant materials which is also known as catabolism releases energy by consuming oxygen and releasing carbon dioxide and water. The microbiological degradation which is the major cause of degradation or deterioration in stored animal materials such as fresh meat and the like is caused largely by microorganisms. These also consume oxygen and produce carbon dioxide and water as with the plant materials. The degradation or deterioration process for both animal and plant materials can therefore be expressed in the following approximate respiratory change equation:

$$nO_2 + (CH_2O)_n \rightarrow nCO_2 + nH_2O$$

In this equation which expresses the chemical reactions involved, $(CH_2O)_n$ represents a carbohydrate molecule that is destroyed during the degradation or deterioration process as explained above with $n$ being a whole number dependent upon the size of the molecule, with the size of the molecule, of course, depending upon the number of recurring $CH_2O$ units present. The practical lower limit of $n$ is, of course, 6 and in this case the carbohydrate molecule would be that of a simple sugar. For more complex molecules $n$ could be extremely large such as 1,000,000 or more. However, in every instance one molecule of oxygen is consumed for each $CH_2O$ unit in the carbohydrate with the production of one molecule of carbon dioxide and one molecule of water. The carbohydrates are either present as such in the plant materials and microorganisms discussed above or may be produced as end products from other substances such as proteins and fats. In any event, the deterioration changes on storage of both animal and plant materials in the presence of oxygen, such as the oxygen of normal air, is expressed by the above chemical reaction equation.

The above formula is actually a simplified formula as the carbohydrate that is consumed ordinarily passes through a series of steps including a sugar stage, an acid stage and finally to the reaction products of carbon dioxide and water as indicated.

The method and apparatus of this invention results from the discovery that the progress of this equation can be retarded so as to slow down the aging process of stored plant and animal materials by, first, controlling the atmosphere to which the materials are subjected and, second, continually replenishing this atmosphere during the storage period. It is virtually impossible as a practical matter to stop the progress of the reaction equation for the stored materials and stopping is not desired, as otherwise the stored materials would not respirate which is necessary to maintain their fresh characteristics. However, the storage period can be greatly extended to maintain the freshly stored appearance of the materials by slowing down the rate of the reaction.

In order to retard the progress of the above equation the storage atmosphere must contain reduced oxygen and increased carbon dioxide. As oxygen is being consumed in the above reaction, the amount of oxygen is maintained at an amount less than that found in ordinary air. As carbon dioxide is being generated the amount of carbon dioxide in the storage atmosphere is greater than that normally found in air. Thus, on one hand the storage condition results in "starving" the carbohydrate so that its rate of deterioration is retarded. On the other hand, the carbohydrate is "flooded" with carbon dioxide so as to retard the reaction further. Thus, both the amount of oxygen and the amount of carbon dioxide serve to retard the rate of reaction and extend the storage life.

As is evident from the above explanation, the amounts of oxygen and carbon dioxide are not important so long as enough oxygen is present to permit the respiration progress of the equation but at a slower rate of respiration. If maximum storage life is desired, this amount of oxygen is only sufficient to maintain respiration of the stored materials. If only a very slight extension of the storage period is required, the amount of oxygen can be only slightly less than that found in normal air. As is well known, ambient or normal air customarily contains about 21% oxygen and about 0.03% carbon dioxide, both by volume, with the remainder of the air being nitrogen and minor amounts of other inert gases.

In the method and apparatus of this invention the preserving atmosphere is produced by burning a carbonaceous fuel in the presence of oxygen to produce an atmosphere containing an amount of carbon dioxide greater than that found in ambient air and an amount of oxygen less than that found in ambient air. If the fuel is a hydrocarbon, one of the end products of combustion is water.

In one embodiment of the invention the burning of the fuel not only produces the preserving atmosphere but also supplies energy to provide refrigeration. This is useful for subjecting the perishable materials that are preserved best by refrigeration plus controlled atmosphere simultaneously to the controlled preserving atmosphere and to chilling. The burning of the fuel also imparts a high moisture content to the atmosphere. The amount of moisture can be easily controlled by known methods such as removal by condensation.

One of the features of this invention, therefore, is to provide an improved method of storing perishable animal and plant materials by burning a carbonaceous fuel in the presence of excess oxygen to generate a controlled preserving atmosphere for such materials.

Another feature of the invention is to provide an improved apparatus for such storing.

Other features and advantages of the invention will be apparent from the following description of one embodiment of an apparatus and several embodiments of methods for practicing the invention. The single FIGURE of the accompanying drawing illustrates diagrammatically such an apparatus.

In the embodiment shown in the drawing, there is disclosed diagrammatically a storage chamber 10 here shown as an insulated food storage cabinet such as a conventional gas refrigerator, and a conventional gas refrigeration unit 11. Only the boiler portion 12 of the gas refrigeration unit as well as associated structure is illustrated in the accompanying drawing. Thus, the boiler is used in the customary manner to boil off ammonia from a water and ammonia solution that is rich in ammonia. This is the customary operation of a boiler unit in a gas refrigeration system. The ammonia gases thereupon flow upwardly in a conduit 13 into the remainder of the refrigeration system (not shown).

The boiler 12 is heated by a gas flame from a conventional burner 14 having a gas inlet pipe 15 where the gas flow is controlled by a valve 16. Air supply to the burner 14 is through a pipe 17 controlled by a valve 18.

As is customary the gaseous combustion products pass through a flue pipe 19 in the boiler 12 and then outwardly through a conduit 20. Flow through the conduit 20 is forced flow by a conventional electronically operated blower 21. On the high pressure side of blower 21 a branch 20a of conduit 20 is vented to atmosphere through a valve 20b. This is necessary since only a portion of the products of combustion generated by the burner 14 are necessary for the production of the preserving atmosphere. The gas pressure in the conduit 20 is controlled by a pressure release valve 22 that automatically opens under a predetermined pressure.

The conduit 20 extends through the insulated wall 23 of the refrigerator 10 and is provided with a number of passes 24 within the refrigerator 10 to produce a condenser. As the condenser 24 is chilled by the low temperature within the refrigerator, moisture will tend to condense from the gases so that excess moisture is removed leaving a substantially saturated gas at the low temperature to which it is chilled. This condensed moisture collects in a trap 25 and can then flow to a point of disposal which may be the same as that used for the defrost water of the refrigerator itself. The purpose of release valve 22 is to allow flue gases to escape if the refrigerator should accidentally get too cold and allow the water to freeze in condenser 24, which would block the flow. The normal pressure in line 20 would be about 1 inch of water or less, and pressure release valve 22 would be set to open at a pressure slightly greater than 1 inch of water.

From the condenser 24 the chilled gases pass through a container 26 which contains a filtering medium such as activated charcoal which may be of from 2 to 4 mesh up to about 30 mesh average particle size. For a 10 cubic foot household refrigerator, for example, about 5 pounds of such charcoal would preferably be used. In this example, the flow of the gases could be at a rate of about 1.5 ft.$^3$ per hour. This filtering medium removes impurities from the gases which appear to include the various oxides of nitrogen and unburned or partially burned fuel gases.

From the filter container 26 there is provided a conduit 28 leading into a storage container 29 which may be the usual container for storing vegetables. On top of this container 29 is a cover 30 that is loose fitting so as to provide for fluid flow between the container and the cover. The conduit 28 is provided with a number of openings 31 within the container 29 so that the gases will flow from the conduit 28 out these openings 31. From the openings 31 the gases flow through the container 29 and then out into the refrigerated space 32 within the refrigerator. There are the usual screw and bolt openings as well as the usual imperfectly fitting door so as to provide a plurality of outlets illustrated diagrammatically at 33 so that the preserving atmosphere which fills the space 32 continually flows out of the refrigerator 10 and is replenished by more gases coming from the flue 19.

As illustrated, the condenser 24, filter container 26 and conduit 28 are preferably all within the refrigerated space 32 so that the gases flowing through these elements are cooled in this embodiment to substantially the same temperature as that of the refrigerated space before these gases are ejected through the openings 31.

The carbon dioxide and oxygen content of the gases from the boiler 12 may be easily controlled by controlling the gas and air flows by the valves 16 and 18 in the customary and well known manner. For example, approximately 20–25% excess air over that required for combustion is supplied in this embodiment to provide the proper amount of oxygen. By controlling the storage atmosphere in this manner the progress of the above equation to the right, which is an indication of the degradation of the material, is retarded. Tests have shown that both animal and plant materials can be stored for much longer periods of time under the conditions of this invention for an equal amount of degradation. Thus, the materials can be stored at least four times longer in the controlled atmosphere of this invention than they can be stored in an ordinary refrigerator where the temperature conditions are the same as those employed in this invention.

Although the illustrative embodiment shows refrigeration, the stored materials may be maintained at a temperature that is either ambient or below or above ambient depending on many factors such as the length of the storage time, the type and source of materials being stored and the nature of the material itself. A practical but not excluding limit of temperature is about 29–120° F. Maintenance of the storage temperature may, in certain instances, require heating means in order to maintain even the minimum temperature if the surrounding ambient temperature should be too low. For storing plant and animal materials such as fresh foods, a storage temperature of about 29–55° F. is preferred.

In the preferred method of practicing the invention the combustion conditions are so controlled that the amount of oxygen in the atmosphere produced is maintained between approximately 1% and 10% by volume of the atmosphere and the amount of carbon dioxide is maintained from approximately 0.5 to 6 times the amount by volume of the oxygen with the remainder of the atmosphere being a gas such as nitrogen from the air supply that is inert to the stored materials and which therefore has no measurable chemical effect on the materials. In most instances, the amount of carbon dioxide is preferably between about 1% and 15% by volume when the amount of oxygen is between about 1% and 10% by volume. For example, an atmosphere that has been found to be effective for most storage under the conditions of this invention is one containing 4% oxygen, 10% carbon dioxide and 86% nitrogen. Some materials such as certain fruits may be better stored in an atmosphere containing 3% oxygen, 2% carbon dioxide and 95% inert gases, while other fruits may require for best results a storage atmosphere of 1% oxygen, 5% carbon dioxide and 94% inert gases. Of course, it is most important that the atmosphere, regardless of its actual gas content, is vented from the storage space during the time the preserving atmosphere is being supplied, so that the incoming atmosphere substantially continually replenishes the atmosphere within the space and so that the atmosphere is not static.

The continual replenishing of the atmosphere within the storage space is necessary in order to remove respiration products as well as other products of aging. We have discovered that if these products resulting from the storage in the atmosphere of this invention are not removed damage to the stored materials frequently occurs. Furthermore, by subjecting the stored materials to optimum conditions which include the continual replenishing of the storage atmosphere the appearance and quality of the stored materials may be maintained at desirable levels throughout the storage period. This continual replenishing may be achieved as indicated in the specific embodiment by venting the atmosphere from the storage chamber as fresh atmosphere is introduced.

Most animal and plant materials will be stored at 85–100% relative humidity. With some materials such as onions, grains and nuts the humidity may be lower such as that of ambient conditions. Thus the relative humidity may be as low as 25% or lower and as high as 100%.

Under storage conditions as explained herein and where the storage, for example, is in a household refrigerator the concentration of oxygen and carbon dioxide within the refrigerator would of course vary from time to time as the refrigerator door is opened and closed to insert and remove foods. In the normal household, tests have shown that the door is opened approximately 88 times during each 24 hour period. Each time the door is opened the percentage of oxygen increases as more oxygen is admitted from the ambient atmosphere while the amount of carbon dioxide decreases due to the escape of a portion of the storage atmosphere. However, these changes within the refrigerator apparently have no measurable effect on the storage life of animal and plant materials within the refrigerator when compared to a test condition when the door has remained closed for the entire storage life.

With the method and apparatus of this invention it has been found that many foods, for example, may be stored in a household refrigerator which is in constant use for four weeks and longer without serious degradation. In fact, berries such as strawberries and raspberries and the like have been stored for the full four weeks term at 34° F. in at atmosphere initially of 4% oxygen, 10% carbon dioxide and 86% nitrogen in which the door was opened 88 times per 24 hour period without excessive loss of color, texture and taste in the berries.

Examples of animal and plant materials that may be stored for long periods of time under the conditions of this invention are non-food materials such as cut flowers, tobacco, flower bulbs and the like and foods such as apples, berries, peaches, pears, milk products including milk, butter, and cheese, onions, celery, carrots, tomatoes, oranges, meat and meat products, eggs, potatoes, bananas, grapes, asparagus, beans, grains, nuts, peas and the like.

Having described our invention as related to the embodiments set out herein, it is our intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. Apparatus for storing for a storage period perishable animal and plant materials subject to respiratory deterioration changes on storage in air containing normal quantities of oxygen and carbon dioxide wherein oxygen is consumed and carbon dioxide is produced according to the following approximate respiratory change equation:

$$nO_2 + (CH_2O)_n \rightarrow nCO_2 + nH_2O$$

wherein $(CH_2O)_n$ represents a carbohydrate molecule from said materials, comprising: means forming an enclosure having a storage space for said materials, means for supplying in said storage space during said period a storage atmosphere containing oxygen and carbon dioxide, the amount of oxygen being less than said normal air quantity to retard but not prevent the progress of said equation, and the amount of carbon dioxide being greater than said normal air quantity to retard but not prevent the progress of said equation, said means for supplying including a fuel burner for burning a carbonaceous fuel in the presence of excess oxygen to produce burner gases and means for removing any undesirable combustion products from said gases; means for circulating said atmosphere in said space during said period; and means for substantially continually replenishing said atmosphere in said space.

2. The apparatus of claim 1 wherein said amount of oxygen is about 1–10% by volume of said atmosphere and the amount of carbon dioxide is about 0.5–6 times the amount by volume of said oxygen.

3. Apparatus for storing for a storage period perishable animal and plant materials subject to respiratory deterioration changes on storage in air containing normal quantities of oxygen and carbon dioxide wherein oxygen is consumed and carbon dioxide is produced according to the following approximate respiratory change equation:

$$nO_2 + (CH_2O)_n \rightarrow nCO_2 + nH_2O$$

wherein $(CH_2O)_n$ represents a carbohydrate molecule from said materials, comprising: means forming an enclosure having a storage space for said materials; means for supplying in said storage space during said period a storage atmosphere containing oxygen and carbon dioxide, the amount of oxygen being less than said normal air quantity to retard but not prevent the progress of said equation, and the amount of carbon dioxide being greater than said normal air quantity to retard but not prevent the progress of said equation; means for circulating said atmosphere in said space during said period; means for maintaining a relative humidity of about 25–100% in said storage space during said period; means including an absorption refrigeration system having a carbonaceous fuel burner for maintaining said materials at a temperature of about 29–120° F., said means for supplying said atmosphere including said fuel burner to produce burner gases and means for removing any undesirable combustion products from said gases; and means for substantially continually replenishing said atmosphere in said space.

4. The apparatus of claim 3 wherein said amount of oxygen is about 1–10% by volume, said amount of carbon dioxide is about 1–15% by volume, said temperature is about 29–55° F. and said relative humidity is about 85–100%.

5. The apparatus of claim 3 wherein means are provided for supplying oxygen to said burner in an amount of about 20–25% excess over that required for burning of said fuel.

6. The method of storing perishable animal and plant materials subject to respiratory deterioration changes on storage in air containing normal quantities of oxygen and carbon dioxide wherein oxygen is consumed and carbon dioxide is produced according to the following approximate respiratory change equation:

$$nO_2 + (CH_2O)_n \rightarrow nCO_2 + nH_2O$$

wherein $(CH_2O)_n$ represents a carbohydrate molecule from said materials, comprising: burning a carbonaceous fuel in the presence of excess air to produce gases comprising oxygen, carbon dioxide and inert gas; producing a storage atmosphere from said gases by controlling the amount of oxygen to less than said normal air quantity to retard but not prevent the progress of said equation and controlling the amount of carbon dioxide to greater than said normal air quantity to retard but not prevent the progress of said equation and removing undesirable combustion products from said gases; subjecting said materials to said atmosphere; and substantially continually replenishing said atmosphere.

7. The method of claim 6 wherein said amount of oxygen is about 1–10% by volume of said atmosphere and the amount of carbon dioxide is about 0.5–6 times the amount by volume of said oxygen.

8. The method of claim 6 wherein said atmosphere is of about 25–100% relative humidity and a temperature of about 29–120° F., said oxygen is about 1–10% by volume and said carbon dioxide is about 1–15% by volume.

References Cited in the file of this patent

UNITED STATES PATENTS

| | | |
|---|---|---|
| 1,259,410 | Kapadia | Mar. 12, 1918 |
| 2,309,007 | Parsons | Jan. 19, 1943 |
| 2,389,267 | Matthei | Nov. 20, 1945 |
| 2,483,064 | Reich | Sept. 27, 1949 |
| 2,923,629 | Bonomi | Feb. 2, 1960 |
| 2,955,940 | Williams | Oct. 11, 1960 |